(12) United States Patent
Ho et al.

(10) Patent No.: US 9,167,571 B2
(45) Date of Patent: *Oct. 20, 2015

(54) BASE STATION AND METHOD FOR RESOURCE ALLOCATION USING LOCALIZED AND DISTRIBUTED RESOURCE BLOCKS

(71) Applicant: Intel Corporation, Santa Clara, CA (US)

(72) Inventors: Minnie Ho, Los Altos, CA (US); Qinghua Li, San Ramon, CA (US); Xintian E. Lin, Palo Alto, CA (US); Vallabhajosyula S. Somayazulu, Portland, OR (US); Shilpa Talwar, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 13/662,844

(22) Filed: Oct. 29, 2012

(65) Prior Publication Data

US 2013/0286999 A1    Oct. 31, 2013

Related U.S. Application Data

(63) Continuation of application No. 13/400,762, filed on Feb. 21, 2012, now Pat. No. 8,301,155, which is a continuation of application No. 11/687,393, filed on Mar. 16, 2007, now Pat. No. 8,131,306.

(60) Provisional application No. 60/784,418, filed on Mar. 20, 2006.

(51) Int. Cl.
*H04W 72/04*    (2009.01)
*H04B 7/02*    (2006.01)
(Continued)

(52) U.S. Cl.
CPC .............. *H04W 72/042* (2013.01); *H04B 7/02* (2013.01); *H04L 5/00* (2013.01); *H04W 72/048* (2013.01); *H04W 72/0453* (2013.01); *H04W 88/08* (2013.01)

(58) Field of Classification Search
CPC ... H04L 1/0026; H04L 5/0023; H04L 1/0073; H04L 1/1829; H04L 2025/03802; H04L 1/1854; H04L 1/1887; H04L 1/0058; H04B 17/0067; H04B 17/0042; H04B 7/024; H04B 7/0626; H04B 17/005; H04B 7/063
See application file for complete search history.

(56) References Cited

U.S. PATENT DOCUMENTS 6,240,076 B1 * 5/2001 Kanerva et al. ............... 370/330
7,551,937 B2 * 6/2009 Kim et al. ..................... 455/509

(Continued)

FOREIGN PATENT DOCUMENTS

CN    101405973 B    4/2013
CN    103220808 A    7/2013

(Continued)

OTHER PUBLICATIONS

"U.S. Appl. No. 11/687,393, Response filed Nov. 24, 2010 to Final Office Action mailed Sep. 20, 2010", 12 pgs.

(Continued)

*Primary Examiner* — Quan M Hua
(74) *Attorney, Agent, or Firm* — Schwegman Lundberg & Woessner, P.A.

(57) ABSTRACT

Embodiments of a base station and method for resource allocation using localized and distributed resource blocks are generally described herein. The base station comprises processing circuitry to allocate localized resources to user stations based on receipt of channel quality information received from the user stations and to allocate distributed resource to user stations based on non-receipt of channel quality information. The base station also comprises physical layer circuitry to transmit control information on a physical channel to indicate the resources that are allocated to each scheduled user station.

21 Claims, 3 Drawing Sheets

(51) Int. Cl.
*H04L 5/00* (2006.01)
*H04W 88/08* (2009.01)

(56) References Cited

U.S. PATENT DOCUMENTS

| | | | |
|---|---|---|---|
| 8,131,306 B2 * | 3/2012 | Ho et al. | 455/452.2 |
| 8,301,155 B2 * | 10/2012 | Ho et al. | 455/452.2 |
| 2002/0119781 A1 * | 8/2002 | Li et al. | 455/450 |
| 2003/0128658 A1 | 7/2003 | Walton et al. | |
| 2005/0085236 A1 | 4/2005 | Gerlach | |
| 2005/0099937 A1 * | 5/2005 | Oh et al. | 370/207 |
| 2005/0159162 A1 | 7/2005 | Park | |
| 2005/0201476 A1 | 9/2005 | Kim et al. | |
| 2006/0120392 A1 | 6/2006 | Ye et al. | |
| 2006/0262874 A1 | 11/2006 | Shan | |
| 2007/0110003 A1 | 5/2007 | Tujkovic et al. | |
| 2007/0223440 A1 | 9/2007 | Ho et al. | |
| 2008/0080637 A1 * | 4/2008 | Khan et al. | 375/267 |
| 2012/0147846 A1 | 6/2012 | Ho et al. | |

FOREIGN PATENT DOCUMENTS

| | | |
|---|---|---|
| EP | 1432164 A2 | 6/2004 |
| WO | WO-0249305 A2 | 6/2002 |
| WO | WO-03058871 A1 | 7/2003 |
| WO | WO-2005069514 A1 | 7/2005 |
| WO | WO-2005086384 A1 | 9/2005 |
| WO | WO-2005125250 A1 | 12/2005 |
| WO | WO-2006000091 A1 | 1/2006 |
| WO | WO-2007109610 A1 | 9/2007 |

OTHER PUBLICATIONS

"European Application Serial No. 07758814.3, Amendment filed Dec. 5, 2013", 17 pgs.
"U.S. Appl. No. 11/687,393, Examiner Interview Summary mailed Jul. 18, 2011", 3 pgs.
"U.S. Appl. No. 11/687,393, Response filed Nov. 24, 2010 to Final Office Action mailed Sep. 2, 2010", 12 pgs.
"U.S. Appl. No. 13/400,762, 312 Amendment filed Sep. 20, 2012", 3 pgs.
"European Application Serial No. 07758814.3, Extended European Search Report mailed May 7, 2013", 10 pgs.
"International Application Serial No. PCT/US2007/064302, International Preliminary Report on Patentability mailed Oct. 2, 2008", 5 pgs.
"U.S. Appl. No. 11/687,393, Response filed Jul. 15, 2011 to Non Final Office Action mailed Apr. 15, 2011", 16 pgs.
"U.S. Appl. No. 11/687,393 Final Office Action mailed Sep. 2, 2010", 15 pgs.
"U.S. Appl. No. 11/687,393, Non Final Office Action mailed Apr. 15, 2011", 17 pgs.
"U.S. Appl. No. 11/687,393, Non-Final Office Action mailed Mar. 19, 2010", 11 pgs.
"U.S. Appl. No. 11/687,393, Notice of Allowance mailed Oct. 26, 2011", 16 pgs.
"U.S. Appl. No. 11/687,393, Response filed Jun. 21, 2010 to Non Final Office Action mailed Mar. 19, 2010", 16 pgs.
"U.S. Appl. No. 13/400,762, Notice of Allowance mailed Jun. 20, 2012", 16 pgs.
"U.S. Appl. No. 13/400,762, Response to Rule 312 mailed Oct. 4, 2012". 2 pgs.
"Chinese Application Serial No. 200780009924.6, Response filed May 31, 2011 to Non Final Office Action mailed Mar. 3, 2011", 3.
"Chinese Application Serial No. 200780009924.6, Office Action mailed Mar. 3, 2011", with English translation, 5 pgs.
"Resource Allocation Mapping Rules and TP", Motorola, Agenda Item 13.1.3 for 3GPP TSG RAN1#44 Meeting, Denver, CO, Feb. 13-17, 2007, http://www.3gpp.org/ftp/tsg_ran/WG1_RL1/TSGR1_44/Docs/, 1-4.
"Search Report", Application No. PCT/US2007/PCT064302, 3 pgs.
"Taiwanese Application Serial No. 96109362, Office Action mailed Jun. 9, 2011", 8 pgs.
"Tawainese Application Serial No. 96109362, Response filed Nov. 29, 2011 to Office Action mailed Jun. 9, 2011", 1 pgs.
"Text proposal on downlink channelization", 3GPP RAN WG 1 LTE ad hoc meeting document R1-060126, (Jan. 2006), 23-25.
"Written Opinion", Application No. PCT/US2007/PCT064302, 2 pgs.
Yaghoobi, Hassan, "Scalable OFDMA Physical Layer in IEEE 802.16 WirelessMAN", Intel Technology Journal, 8(3), (Aug. 20, 2004), 204-206.

* cited by examiner

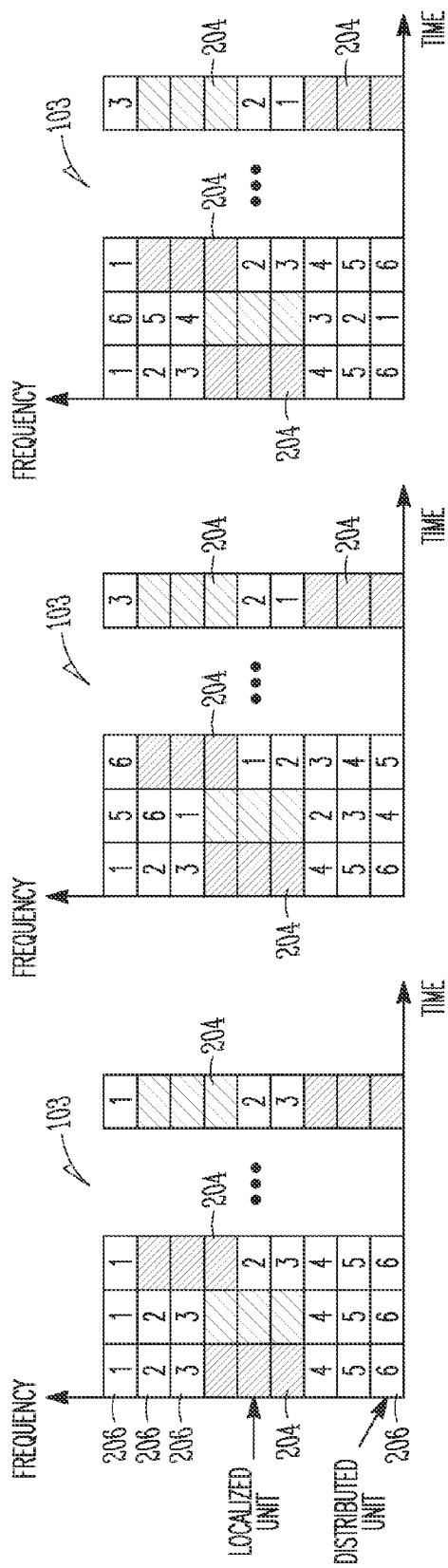

BASE STATION AND METHOD FOR RESOURCE ALLOCATION USING LOCALIZED AND DISTRIBUTED RESOURCE BLOCKS

PRIORITY CLAIM

This application is a continuation of U.S. patent application Ser. No. 13/400,762, filed on Feb. 21, 2012, now issued as U.S. Pat. No. 8,301,155, which is a continuation of U.S. patent application Ser. No. 11/687,393, filed on Mar. 16, 2007, now issued as U.S. Pat. No. 8,131,306, which claims the benefit of priority under 35 U.S.C. 119(e) to U.S. Provisional Patent Application Ser. No. 60/784,418, filed on Mar. 20, 2006, both of which are incorporated herein by reference in their entireties.

TECHNICAL FIELD

Some embodiments of the present invention pertain to wireless access networks. Some embodiments of the present invention pertain to muiticarrier communications.

BACKGROUND

Some wireless access networks, such as broadband wireless access (BWA) networks and orthogonal frequency division multiple access (OFDMA) networks, use a plurality of individual frequency subcarriers for communicating. In some wireless access networks, base stations allocate these subcarriers among several user stations. Issues with subcarrier allocation techniques address include maximizing performance for the various user stations and efficient utilization of bandwidth.

Thus there are general needs for wireless access networks and methods for allocating the time and frequency recourses of a communication channel. There are also general needs for wireless access networks and methods for allocating the time and frequency recourses of a communication channel that help maximize performance for user stations while efficiently utilizing the channel bandwidth.

BRIEF DESCRIPTION OF THE DRAWINGS

FIG. 4A illustrates a downlink subframe without renumbering of subcarriers;

FIG. 4B illustrates a downlink subframe with cyclically shifted renumber subcarriers accordance with some embodiments of the present invention; and FIG. 4C illustrates a downlink subframe with reverse alternate numbering of subcarriers accordance with some embodiments of the present invention.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
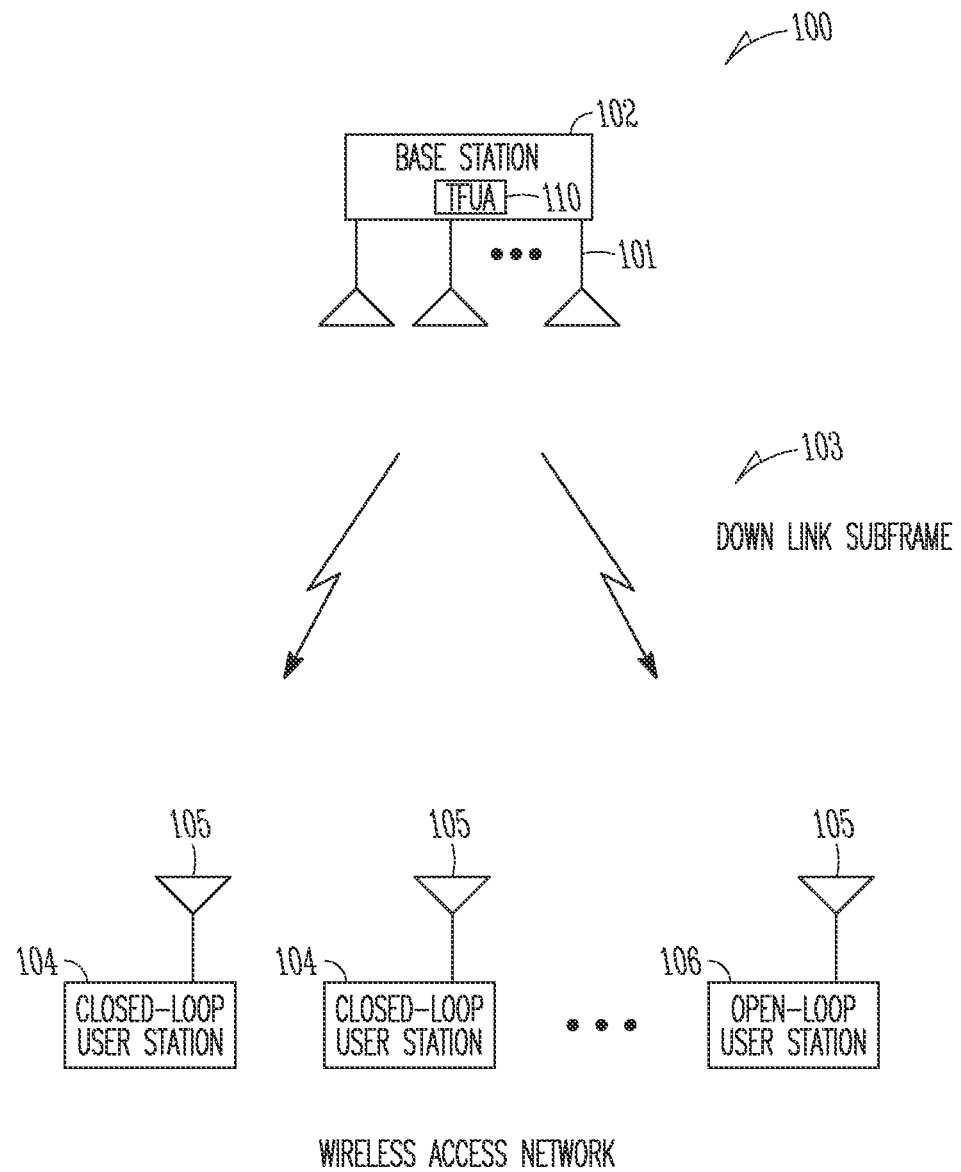
FIG. 1 is a functional block diagram of a wireless access network in accordance with some embodiments of the present invention.

FIG. 1 is a functional block diagram of a wireless access network in accordance with some embodiments of the present invention. In wireless-access network 100, base station 102 may allocate time-frequency units of downlink subframe 103 to closed-loop user stations 104 and to open-loop user stations 106. In some embodiments, base station 102 may allocate contiguous groups of data subcarriers of downlink subframe 103 to closed-loop user stations 104, and may allocate remaining data subcarriers of downlink subframe 103 to open-loop user stations 106 to increase frequency diversity.

In some embodiments, base station 102 may include time-frequency unit allocator (TFUA) 110 which may perform the allocations. Time-frequency unit allocator 110 may comprise software or a combination of hardware, firmware, and software. Various embodiments of the allocation operations of time-frequency unit allocator 110 are discussed in more detail below.

Base station 102 may be coupled to one or more antennas 101 for communicating RF signals with user stations 104 & 106. User stations 104 & 106 may also be coupled to one or more antennas 105 for communicating with one or more base stations, such as base station 102.

Figure 2:
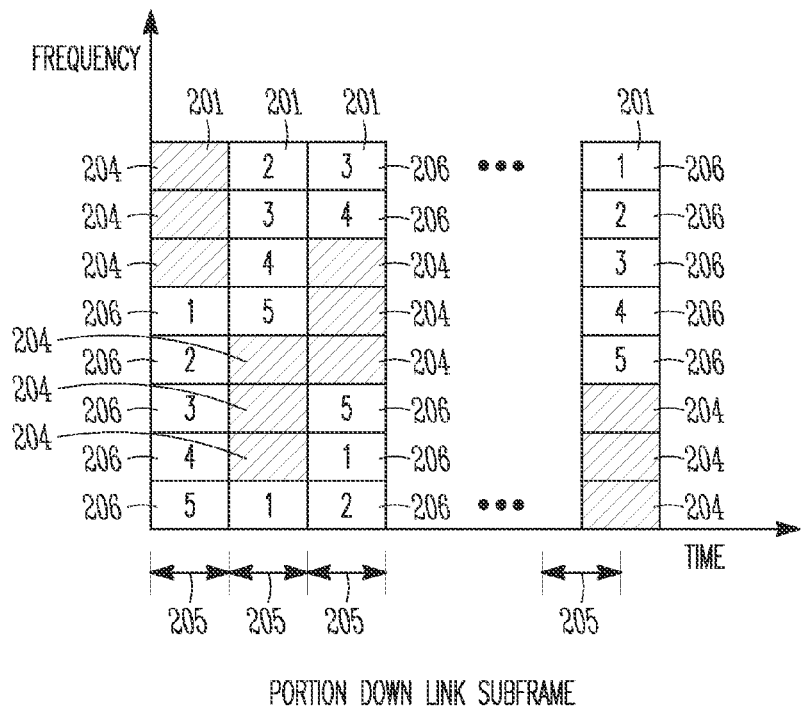
FIG. 2 illustrates time-frequency allocation of a portion of a downlink subframe in accordance with some embodiments of the present invention.

FIG. 2 illustrates time-frequency allocation of a portion of a downlink subframe in accordance with some embodiments of the present invention. Downlink subframe 103 may correspond to downlink subframe 103 (FIG. 1). Downlink subframe 103 comprises time-frequency units 201, which may comprise one or more subcarriers frequency and one or more time-units 205 in time. Referring to FIGS. 1 and 2 together, in accordance with some embodiments, base station 102 allocates contiguous groups 204 of data subcarriers of downlink subframe 103 to closed-loop user stations 104 (i.e., reduced frequency diversity) and allocates remaining data subcarriers 206 of downlink subframe 103 to open-loop user stations 106 (i.e., increased frequency diversity).

In FIG. 2, the numbers 1-5 shown inside time-frequency units 201 may correspond to a particular open-loop user station 106 that may be assigned that particular time-frequency unit 201. For simplicity, downlink subframe 103 is illustrated in FIG. 2 as having only eight subcarriers (in frequency), however actual implementations may include up to one hundred or more subcarriers.

In some embodiments, base station 102 may allocate contiguous groups 204 of the data subcarriers to closed-loop user stations 104 for each time-unit 205 within downlink subframe 103. Base station 102 may also allocate remaining data subcarriers 206 non-contiguously to each open-loop user station 106 for each time-unit 205 within downlink subframe 103. In these embodiments, time-diversity as well as frequency diversity may be maximized for each open-loop user station 106.

In some embodiments, wireless access network 100 may be an orthogonal frequency division multiple access (OFDMA) network, and each time-unit 205 may comprise an OFDMA symbol. Base station 102 may allocate the same contiguous groups 204 of the data subcarriers closed-loop user stations 104 for a plurality of OFDMA symbols. Base station 102 may allocate different ones of remaining data subcarriers 206 to open-loop user stations 106 for each OFDMA symbol. In these embodiments, the same contiguous groups 204 of the data subcarriers may be allocated to closed-loop user stations 104 for more than one or all OFDMA symbols of downlink subframe 103. In some 3GPP LTE embodiments, discussed below, there may be six or seven OFDMA symbols of a downlink subframe, although the scope of the invention is not limited in this respect. In some alternate embodiments, the same remaining data subcarriers 206 may be allocated to open-loop user stations 106 for more than one or all OFDMA symbols of downlink subframe 103, although the scope of the invention is not limited in this respect.

One advantage to allocating contiguous groups 204 of the data subcarriers to closed-loop user stations 104 for a plurality of OFDMA symbols is that the channel response variation across frequency may be greater than it is across time. Another advantage to allocating contiguous groups 204 of the data subcarriers to closed-loop user stations 104 for a plurality of OFDMA symbols, rather than a per-symbol basis, is that that overhead may be reduced. In other words, the allocated time-frequency block may be provided over a narrower span in frequency and wider span in time. On the other hand, for open-loop user stations 206, it may be desirable to increase frequency diversity so that subcarriers allocated to open-loop user stations 106 may be widely distributed across frequency (i.e., a larger span in frequency).

In some embodiments, for each time-unit 205, contiguous groups 204 of data subcarriers may be allocated to closed-loop user stations 104 prior to the allocation of remaining data subcarriers 206 to open-loop user stations 106. In these embodiments, in each subsequent time-unit 205, after an initial allocation of contiguous groups 204 of data subcarriers to closed-loop user stations 104, remaining data subcarriers 206 may be reallocated to open-loop user stations 106.

In some embodiments, base station 102 may allocate remaining data subcarriers 206 to open-loop user stations 106 by systematically partitioning a sequence of remaining contiguous data subcarriers into multiple subsequences, and allocating data subcarriers associated with one of the multiple sequences to open-loop user stations 106 on a per-sequence basis. These embodiments are discussed in more detail below. In some embodiments, the multiple subsequences may be selected to have varying lengths. In other embodiments, the multiple subsequences may be selected to have the same length. In these embodiments that use multiple subsequences of the same length or varying length, remaining data subcarriers 206 may be intermixed among open-loop user stations 106, which may help maximize both frequency diversity and time diversity.

In some embodiments, base station 102 may reallocate remaining data subcarriers 206 of downlink subframe 103 to open-loop user stations 106 by cyclically shifting remaining data subcarriers 206 for each one or more time-units 205. Remaining data subcarriers 206 may be reallocated to open-loop user stations 106 based on the cyclically shifting. An example of this is illustrated FIG. 4B, described in more detail below.

In some other embodiments, base station 102 may reallocate remaining data subcarriers 206 of downlink subframe 103 to open-loop user stations 106 by renumbering remaining data subcarriers 206 for each one or more time-units 205. Remaining data subcarriers 206 may be reallocated to open-loop user stations 106 based on the renumbering. An example of this is illustrated in FIG. 4C, described in more detail below.

Closed-loop user stations 104 may comprise user stations with a known channel state, and open-loop user stations 106 comprise user stations with an unknown channel state. In some embodiments, base station 102 may select contiguous groups 204 of data subcarriers for allocation based on favorable channel state information provided by closed-loop user stations 104, although the scope of the invention is not limited in this respect. In these embodiments, closed-loop user stations 104 may feed back either partial or full channel state information to base station 102. In these embodiments, base station 102 may select a contiguous group of subcarriers for allocation a closed-loop user station 104 based on the fedback channel state information.

In some embodiments, base station 102 may allocate contiguous groups 204 of data subcarriers based on an index provided by closed-loop user stations 104. The index may indicate a group of contiguous data subcarriers selected by a particular closed-loop user station 104. In these other embodiments, closed-loop user stations 104 may feed back an index to base station 102 indicating a desired sub-band (i.e., a contiguous group of subcarriers). In these embodiments, base station 102 may allocate a contiguous group 204 of sub carriers to a particular closed-loop user station 104 that is indicated by the index.

In some embodiments, base station 102 may determine the number of the data subcarriers of a contiguous group to allocate to each closed-loop user station 104 based on a coherence bandwidth of a channel associated with each of closed-loop user stations 104, although the scope of the invention is not limited in this respect. In some embodiments, the number of data subcarriers of a group allocated to the closed-loop stations may vary (i.e., the chunk size may vary) as there is no requirement that each contiguous group 204 comprise the same number of subcarriers.

In some embodiments, downlink subframe 103 may comprise a set of pilot sub carriers. Both closed-loop user stations 104 and open-loop user stations 106 may use the same set of pilot subcarriers for channel estimation for use in processing received data. In these embodiments, the pilot subcarriers may be common to both closed-loop and open-loop user stations 104, 106. As discussed above, closed-loop user stations 104 may provide channel state information based on channel estimates to base station 102. In some embodiments, an open-loop user station 106 may become a closed-loop user station 104 after it provides channel state information to base station 102. On the other hand, a closed-loop user station 104 may become an open-loop user station 106 when base station 102 no longer possesses valid channel state information for that user station.

In some embodiments, base station 102 may use beamforming to send data to some closed-loop user stations 104. In these embodiments, some dedicated pilot subcarriers may be sent over a beamformed channel to allow a closed-loop user station 104 to estimate a beamforming matrix or weights and the channel response matrix. These dedicated pilots are generally not received or utilized by other user stations. In accordance with some embodiments, closed-loop user stations 104 that do not employ beamforming may achieve increased performance by selecting a favorable sub-band, as discussed above. In embodiments that employ beamforming, the common pilot subcarriers are not beamformed so that all user stations may be able to estimate the channel response without being affected by beamforming weights.

Although base station 102 is illustrated as having several separate functional elements, one or more of the functional elements may be combined and may be implemented by combinations of software-configured elements, such as processing elements including digital signal processors (DSPs), and/or other hardware elements. For example, some elements, such as TFUA 110, may comprise one or more microprocessors, DSPs, application specific integrated circuits (ASICs), and combinations of various hardware and logic circuitry for performing at least the functions described herein. In some embodiments, the functional elements of base station 102, such as TFUA 110, may refer to one or more processes operating on one or more processing elements.

For closed-loop user stations 104, it may not be very likely that each closed-loop user station 104 scheduled is downlink subframe 103 rides on its peak channel response because the peaks of different closed-loop user stations 104 may collide, (i.e. two closed-loop user stations 104 desire for the same subcarrier or group of subcarriers). Similarly, it is likely that some subcarriers may be unfavorable to many closed-loop user stations 104 and should not be assigned to closed-loop user stations 104. This may create waste for the system resource. Because open-loop user stations 106 are not particular as to the subcarriers that are assigned as long as the assigned subcarriers have enough frequency (or time) span (i.e. frequency diversity), the combining of the two modes of subcarrier allocation as discussed above may help reduce waste resulting in more efficient use of the channel bandwidth. In these embodiments, base station 102 may first allocate contiguous groups 204 of subcarriers (using a localized technique) to closed-loop user stations 104 whose channel state information is available, and may then allocate remaining subcarriers 206 to open-loop user stations 106. Some specific embodiments for allocating remaining subcarriers 206 to open-loop user stations 106 are described in more detail below.

In some embodiments, remaining subcarriers 206 may first be renumbered to form a group. Base station 102 may assign subcarriers in the group to different open-loop user stations 106. The number of subcarriers allocated to each pf open-loop user stations 106 may be different. One goal for subcarrier assignment to open-loop user stations 106 is to help increase or maximize frequency diversity. In some embodiments, base station 102 may implement two criterions: span range and evenness. In these embodiments, the assigned subcarriers may span out in the remaining bandwidth as widely as possible and the sum of the deviations of the subcarrier spacing may be minimized for each of open-loop user stations 106. The smaller the deviation, the evener the subcarrier spacing fir a particular open-loop user station 106 may be.

Some embodiments for allocating remaining subcarriers 206 among open-loop user stations 106 partition a sequence of natural numbers into subsequences such that the sum of the deviations of the subsequence's spacing is minimized. The allocation may remain constant for one or multiple OFDMA symbols, although the scope of the invention is not limited in this respect. In these embodiments:

$N_s$=the number of available subcarriers;
K=the number of scheduled open-loop user stations 106;
$L_k$=the number of subcarriers needed by the k-th user station.

Figure 3:
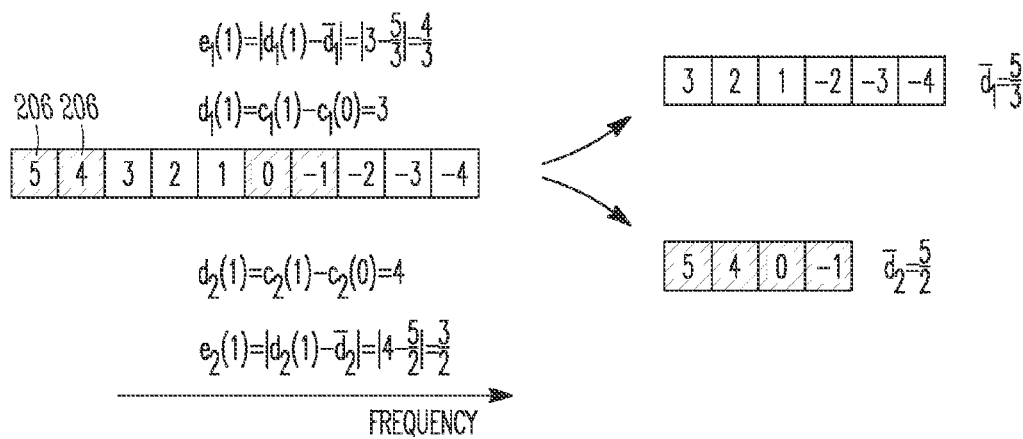
FIG. 3 illustrates subcarrier spacing and spacing deviation in accordance with some embodiments of the present invention.

The optimality of the allocation technique may be measured by the sum of the deviations on each user station's subcarrier spacing as follows:

$$m = \sum_{k=1}^{K} e_k$$

where
$d_k(i)=c_k(i)-c_k(i-1)$ is the i-th subcarrier spacing of the k-th user station, $i=2, \ldots, L_k$; $c_k(i)$ is the subcarrier location;

$$e_k = \sum_{i=1}^{L_k} |d_k(i) - \bar{d}_k|^\gamma$$

is the deviation from the mean spacing for the k-th user station and γ is some integer e.g. 1 or 2. An example of this allocation technique is illustrated in FIG. 3.

In some embodiments, frequency partitioning is performed. In these embodiments, $N_s$ subcarriers may be assigned to open-loop user stations 106 according to their loads, $L_k$s. The loads, $L_k$s, may be sorted in decreasing order so that $L_{k-1} \geq L_k$ for $k=2, \ldots, K$.

In some embodiments, an optimal allocation may be performed. In these embodiments, the common factor of ratio $L_1:L_2:\ldots:L_K$ may be first removed and the resultant ratio is $l_1:l_2:\ldots:l_K$. The optimal allocation for the ratio can be found using the Viterbi search algorithm, although the scope of the invention is not limited in this respect. Because the search may be time consuming, the allocation pattern for each usable ratio may be computed and stored off line, although the scope of the invention is not limited in this respect.

In some embodiments, a suboptimal allocation may be performed. In these embodiments, the common factor of ratio $L_1:L_2:\ldots:L_K$ may be first removed and the resultant ratio may be $l_1:l_2:\ldots l_K$. The suboptimal allocation for the ratio can be computed using the 'round' algorithm. Because the computation may be simple, the allocation pattern may be generated on line on by both base station 102 and user stations 104, 106.

In some embodiments, the following process may be used to determine the suboptimal allocation. A 'round' technique may be used to first sorts the loads of the user stations as $l_1 \geq \ldots \geq l_K$, and then assign remaining subcarriers 206 to each open-loop user stations 106 as follows.

1) Set n=1.
2) Compute the index on the remaining subcarriers $$q_i = \text{round}\left(\frac{i}{l_n} \sum_{k=n}^{K} l_k\right)$$

and assign the $q_i$-th subcarrier to user station n for $i=1 \ldots L_n$.

3) Renumber the remaining subcarriers.
4) If n<K, increment n and return to step 2. Otherwise, assign the remaining subcarriers to user station K.

The term 'round' refers to the function "round" that rounds a real number to the closest integer, and the function can be replaced by integer functions such as floor and ceiling. Since a first open-loop user station 106 may receive an optimal spacing for its subcarriers, the technique may allocate remaining subcarriers to an open-loop user station 106 with the greatest load first. As a result, an earlier allocated open-loop user station 106 may be assigned subcarriers with better spacing than a later allocated open-loop user station 106 because there are more available options for the earlier.

In another embodiment, some subcarriers are not assigned to any of open-loop user stations 106 because there may be subcarriers remaining after the allocation. In these embodiments, a virtual (or dummy) user station may be utilized for the unassigned subcarriers. The virtual user station may be treated the same as open-loop user stations 106 and may use the allocation techniques discussed above. The load of the virtual user station may be sorted with actual user stations. After all the subcarriers are allocated, no data is transmitted on the subcarriers allocated to the virtual user station. In other embodiments, the 'round' algorithm 'round' algorithm may be modified to accommodate a virtual user station.

In other embodiments, the loads of real open-loop user stations 106 $L_k$s, may be sorted in decreasing order so that $L_{k-1} \geq L_k$ for $k=2, \ldots, K$. The load of a virtual user station may be denoted as $L_{K+1}$ is $$N_s - \sum_{k=1}^{K} L_k.$$

It should be noted that $L_{K+1}$ may be greater than some $L_k$ for $k=1, \ldots, K$. The common factor of ratio $L_1:L_2:\ldots:L_K:L_{K+1}$ may be first removed and the resultant ratio is $l_1:l_2:\ldots:l_K:l_{K+1}$.

The following process may be used:
1) Set n=1.
2) Compute the index on the remaining subcarriers $$q_i = \text{round}\left(\frac{i}{l_n} \sum_{k=n}^{K+1} l_k\right)$$

and assign the $q_i$-th subcarrier to user station n for $i=1 \ldots L_n$. The technique name comes from the function "round" that rounds a real number to the closest integer, and the function can be replaced by integer functions such as floor and ceiling.
3) Renumber the remaining subcarriers.
4) If n≤K, increment n and return to step 2. Otherwise, stop and the remaining subcarriers are unused.

The process described above may be used to add a virtual user station at the last place when allocating remaining groups 206 of subcarriers. Similarly, the virtual user station can be added in the first place and the unused subcarriers may be extracted first using the suboptimal algorithm in case one, although the scope of the invention is not limited in this respect.

In other embodiments, the allocated subcarriers may be spread out across the entire bandwidth for real open-loop user stations 106. In networks that include more than one base station and when base stations do not effectively coordinate their resource allocation with each other, base station 102 may spread out the allocated subcarriers for open-loop user stations 106 to avoid co-channel interference. For example, if two base stations share the subcarriers and each cell may have three user stations, each user station may be assigned one subcarrier. Using technique 1, cell one may use subcarriers 8, 9, 10 and cell two also use subcarriers 8, 9, 10. If there is no difference in numbering subcarriers in both cells, the two cells may interfere each other. If there is a difference in the numbering or there is coordination between the cells, the two sets of contiguous subcarriers can separate apart. When there is little or no coordination between cells of base stations, it may be more desirable to spread out the allocated contiguous subcarriers to avoid overlap. When there is coordination between base stations, the contiguous effect of the allocation techniques described above may be desirable for interference avoidance.

In some embodiments, the following subcarrier allocation technique may be used to help equalize the resource allocated to the user stations.

First, the set of physical resources is defined as $S_i$=i, i=1, 2, ..., $N_s$, where $$L = \sum_{k=1}^{K} L_k$$

is the total number of allocated subcarriers for the real user stations; $N_s \geq L$, and define the spacing factor as $S = \lceil N_s/L \rceil$. The steps in this process may be as follows:
1) Sort the user stations according to their subcarrier resource requirements such that $l_1 \geq l_2 \geq \ldots \geq l_K$.
2) Set n=1 and $\tilde{N}_s = N_s$
3) For $i=1, \ldots, l_n$, define $$j = \begin{cases} iS, & i=1, \ldots, \lceil \tilde{N}_s/S \rceil \\ \text{mod}(iS-1, N_s)+1, & i > \lceil \tilde{N}_s/S \rceil \end{cases}$$

4) Compute the set of indices $$q_i = \text{ceil}\left(\frac{j}{l_n} \sum_{k=n}^{K} l_k\right),$$

$$i = 1, \ldots, l_n,$$

where ceil can be replaced by round or floor, and further modify it to obtain $q_i = \text{mod}(q_i-1, \tilde{N}_s)+1$. Next, assign the set of resource elements (subcarriers) $\{q_i, \text{ for } i=1, \ldots, l_n\}$ in $\{S_i\}$ to the $n^{th}$ user with requirement $l_n$.

5) Remove the subcarriers assigned in the previous step from $\{S_i\}$ to form the updated set of subcarriers remaining to be assigned. Update $\tilde{N}_s$ to reflect the reduced number of available subcarriers.

6) If n≤K, increment n and return to Step 3.

With this procedure, the frequency spreading of the allocated resources may be maximized, although the scope of the invention is not limited in this respect.

In some embodiments, subcarrier allocations may be permuted across time-units 205. When a user station is allocated subcarriers on two adjacent time-units 205, it may be desirable that the location of the user station's subcarrier varies across time to further maximize frequency diversity. This may allow the user station employ different sets of subcarriers across time. In some embodiments, time permutation may be performed by renumbering subcarriers over time as illustrated in FIGS. 4B and 4C, discussed in more detail below. The renumbering may be performed to maintain the continuity of the subcarriers. Two methods include shift and reversion. As discussed above, a time-unit 205 for allocation of subcarriers to open-loop user stations 106 may be one OFDMA symbol while closed-loop user stations 104 may be allocated subcarriers for more than one time-unit 205 which may comprise up to one sub-frame with six or more OFDMA symbols, although the scope of the invention is not limited in this respect.

In some embodiments, base station 102 may cyclically shift the number of the subcarriers before or after the localized units are allocated. Namely, the starting point of the subcarrier numbering varies across OFDMA symbols and the numbering wraps around within the bandwidth.

FIG. 4A illustrates a downlink subframe without renumbering of subcarriers. FIG. 4B illustrates a downlink subframe with cyclically shifted renumber subcarriers accordance with some embodiments of the present invention. FIG. 4C illustrates a downlink subframe with reverse alternate numbering of subcarriers accordance with some embodiments of the present invention. In FIGS. 4A-4C, the numbers 1-6 shown inside the time-frequency units may correspond to a particular open-loop user station 106 that may be assigned that particular time-frequency unit 201. For simplicity, downlink subframe 103 is illustrates as having only nine subcarriers (three being assigned as a group of contiguous subcarriers however actual implementations may include up to one hundred or more subcarriers.

Referring to FIG. 4B, when subcarriers are shifted before closed-loop user stations 104 are allocated, the renumbering of the remaining subcarriers may start from the remaining subcarrier has the lowest number in the original numbering. The subcarrier number of the shift may be greater than coherence bandwidth of the channel. For example, shifting 75 subcarriers, which corresponds to a bandwidth 1.125 MHz, may be sufficient for 3GPP LTE networks, although the scope of the invention is not limited in this respect.

Referring to FIG. 4C, in these embodiments, reverse numbering may be employed. In these embodiments, the numbering of subcarriers may be reversed alternately for every time-unit 205 either before or after closed-loop user stations 104 are allocated (i.e., either before or after contiguous groups 204 of subcarriers are assigned to closed-loop user stations 104). The renumbering of the remaining subcarriers may start from the remaining subcarrier has the smallest number in original numbering, although the scope of the invention is not limited in this respect.

In some embodiments, the allocation of subcarriers may be to be specified by base station 102 in the downlink (control) channel or mapping frame so that the addressed user stations can retrieve their data. In some embodiments, base station 102 may first specify the subcarrier allocations for closed-loop user stations 104 per time allocation unit. The subcarrier allocations for open-loop user stations 106 may be specified as follows: The load ratio $l_1:l_2:\ldots:l_K$ and corresponding user station indexes (or IDs) may be sent, where the index and load of the virtual user station may be included. The renumbering method may be predetermined and may not need to be specified, although the scope of the invention is not limited in this respect.

In some embodiments, the techniques for frequency-time resource allocation discussed here may be suitable for use in 3GPP LTE systems, although the scope of the invention is not limited in this respect. These embodiments of the present invention may help maximize multi-user station diversity for closed-loop user stations 104 and frequency-time diversity for open-loop user stations 106, simultaneously, although the scope of the invention is not limited in this respect.

In some embodiments, user stations 104, 106 may comprise a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, base station 102 and user stations 104, 106 may communicate in accordance with standards such as the Pan-European mobile system standard referred to as the Global System for Mobile Communications (GSM), including communication techniques in accordance with 3G wireless standards (e.g., the third generation partnership program (3GPP) Technical Specification, Version 3.2.0, March 2000, or later). In some embodiments, base station 102 and user stations 104, 106 may communicate in accordance with the 3GPP long-term evolution (LTE) specifications, although the scope of the invention is not limited in this respect.

In some other embodiments, base station 102 may be part of a Worldwide Interoperability for Microwave Access (WiMax) communication station. In some embodiments, base station 102 and user stations 104, 106 may communicate in accordance with the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005 and related amendments/versions.

Antenna 101, 105 may comprise one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input, multiple-output (MIMO) embodiments, antennas 101, 105 may be effectively separated to take advantage of spatial diversity and the different channel characteristics that may result between base station 102 and user stations 104, 106.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. An apparatus of an eNodeB arranged for resource allocation in an orthogonal-frequency division multiple access (OFDMA) network, the apparatus comprising transceiver circuitry and processing circuitry arranged to:
   receive uplink signals including reporting information that includes at least a channel quality indicator (CQI) from user equipment (UEs), the CQI comprising an indication of channel quality for a channel comprising a plurality of subcarriers;
   assign virtual resource blocks (VRBs) to the UEs, wherein some of the UEs are assigned VRBs of a localized type and some other of the UEs are assigned VRBs of a distributed type;
   map the VRBs to physical resource blocks (PRBs), each PRB comprising a group of two or more adjacent subcarriers, the VRBs of the localized type being mapped to contiguous PRBs and the VRBs of the distributed type being mapped to non-contiguous PRBs;
   provide downlink control signaling to each of the UEs to indicate whether VRBs of the localized type or VRBs of the distributed type have been assigned and to schedule channel resources for communication; and
   communicate with the scheduled UEs in accordance with a multiple-input multiple output (MIMO) technique using multiple antennas in which downlink signals are precoded for beamforming based at least in part on the reporting information, the downlink signals comprising downlink subframes of six OFDM symbols.

2. The apparatus of claim 1 wherein communications with the scheduled UEs take place in both contiguous PRBs and non-contiguous PRBs of a downlink subframe.

3. The apparatus of claim 2 wherein a number of VRBs assigned to a UE is based on a bandwidth requirement of the UE.

4. The apparatus of claim 2 wherein the VRBs of the localized type are mapped directly to the contiguous PRBs without subcarriers therebetween, and
   wherein the VRBs of the distributed type are mapped to the non-contiguous PRBs having subcarriers therebetween in accordance with a process in which a spacing between the PRBs is based at least in part on a system bandwidth.

5. The apparatus of claim 4 wherein the reporting information received from the UEs include beamforming matrix information, and
   wherein the beamforming matrix information is used to precode the downlink signals for closed-loop MIMO communication.

6. The apparatus of claim 5 wherein the reporting information includes a precoding matrix indicator for beamforming, and
   wherein the precoding matrix indicator is used to precode the downlink signals for closed-loop MIMO communication.

7. The apparatus of claim 4 wherein the processing circuitry is further configured to schedule resources for the transmission of the reporting information including the CQIs by the UEs, the resources being scheduled based on a reporting mode.

8. The apparatus of claim 7 wherein the reporting mode includes a continuous CQI reporting mode and a discontinuous CQI reporting mode, the continuous CQI reporting mode being configured for changing channel conditions, the discontinuous CQI reporting mode being configured for static channel conditions.

9. The apparatus of claim 4 wherein the processing circuitry is arranged to allocate VRBs of either the localized type or the distributed type depending on whether a UE is a closed-loop UE or an open-loop UE,
   wherein the closed-loop UEs comprise UEs from which the reporting information is received; and
   wherein the open-loop UEs comprise UEs from which the reporting information is not received.

10. The apparatus of claim 4 wherein the OFDMA network is a third-generation partnership project long-term evolution network (3GPP LTE) configured network and the eNodeB is configured to operate in accordance with one or more 3GPP LTE standards.

11. A method performed by an eNodeB arranged for resource allocation in an orthogonal-frequency division multiple access (OFDMA) network, the eNodeB comprising transceiver circuitry and processing circuitry, the method comprising:
    receiving uplink signals including reporting information that includes at least a channel quality indicator (CQI) from user equipment (UEs), the CO comprising an indication of channel quality for a channel comprising a plurality of subcarriers;
    assigning virtual resource blocks (VRBs) to the UEs, wherein some of the UEs are assigned VRBs of a localized type and some other of the UEs are assigned VRBs of a distributed type;
    mapping the VRBs to physical resource blocks (PRBs), each PRB comprising a group of two or more adjacent subcarriers, the VRBs of the localized type being mapped to contiguous PRBs and the VRBs of the distributed type being mapped to non-contiguous PRBs;
    providing downlink control signaling to each of the UEs to indicate whether VRBs of the localized type or VRBs of the distributed type have been assigned and to schedule channel resources for communication; and
    communicating with the scheduled UEs in accordance with a multiple-input multiple output (MIMO) technique using multiple antennas in which downlink signals are precoded for beamforming based at least in part on the reporting information, the downlink signals comprising downlink subframes of six OFDM symbols.

12. The method of claim 11 wherein communications with the scheduled UEs take place in both contiguous PRBs and non-contiguous PRBs of a downlink subframe.

13. The method of claim 12 wherein a number of the VRBs assigned to a UE is based on a bandwidth requirement of the UE.

14. The method of claim 12 wherein the VRBs of the localized type are mapped directly to the contiguous PRBs without subcarriers therebetween, and
    wherein the VRBs of the distributed type are mapped to the non-contiguous PRBs having subcarriers therebetween in accordance with a process in which a spacing between the PRBs is based at least in part on a system bandwidth.

15. The method of claim 14 wherein the reporting ing information received from the UEs include beamforming matrix information, and
    wherein the beamforming matrix information is used to precode the downlink signals for closed-loop MIMO communication.

16. The method of claim 15 wherein the reporting information includes a precoding matrix indicator for beamforming, and
    wherein the precoding matrix indicator is used to precode the downlink signals for closed-loop MIMO communication.

17. The method of claim 14 further comprising scheduling resources for the transmission of the reporting information including the CQIs by the UEs, the resources being scheduled based on a reporting mode.

18. The method of claim 17 wherein the reporting mode includes a continuous CQI reporting mode and a discontinuous CQI reporting mode, the continuous CQI reporting mode being configured for changing channel conditions, the discontinuous CQI reporting mode being configured for static channel conditions.

19. The method of claim 14 further comprising allocating VRBs of either the localized type or the distributed type depending on whether a UE is a closed-loop UE or an open-loop UE,
    wherein the closed-loop UEs comprise UEs from which the reporting information is received; and
    wherein the open-loop UEs comprise UEs from which the reporting information is not received.

20. The method of claim 14 wherein the OFDMA network is a third-generation partnership project long-term evolution network (3GPP LTE) configured network and the eNodeB is configured to operate in accordance with one or more 3GPP LTE standards.

21. A non-transitory computer-readable storage medium that stores instructions for execution by one or more processors of an eNodeB to configure the eNodeB to perform operations for resource allocation in an orthogonal-frequency division multiple access (OFDMA) network, the operations to configure the eNodeB to:
    receive uplink signals including reporting information that includes at least a channel quality indicator (CQI) from user equipment (UEs), the CQI comprising an indication of channel quality for a channel comprising a plurality of subcarriers;
    assign virtual resource blocks (VRBs) to the UEs, wherein some of the UEs are assigned VRBs of a localized type and some other of the UEs are assigned VRBs of a distributed type;
    map the VRBs to physical resource blocks (PRBs), each PRB comprising a group of two or more adjacent subcarriers, the VRBs of the localized type being mapped to contiguous PRBs and the VRBs of the distributed type being mapped to non-contiguous PRBs;
    provide downlink control signaling to each of the UEs to indicate whether VRBs of the localized type or VRBs of the distributed type have been assigned and to schedule channel resources for communication; and
    communicate with the scheduled UEs in accordance with a multiple-input multiple output (MIMO) technique using multiple antennas in which downlink signals are precoded for beamforming based at least in part on the reporting information, the downlink signals comprising downlink subframes of six OFDM symbols.

\* \* \* \* \*